(12) United States Patent
Umetsu et al.

(10) Patent No.: US 7,521,649 B2
(45) Date of Patent: Apr. 21, 2009

(54) LASER PROCESSING APPARATUS AND LASER PROCESSING METHOD

(75) Inventors: Kazushige Umetsu, Chino (JP); Daisuke Sawaki, Suwa (JP)

(73) Assignee: Seiko Epson Corporation (JP)

( * ) Notice: Subject to any disclaimer, the term of this patent is extended or adjusted under 35 U.S.C. 154(b) by 70 days.

(21) Appl. No.: 10/984,674

(22) Filed: Nov. 9, 2004

(65) Prior Publication Data
US 2005/0115938 A1 Jun. 2, 2005

(30) Foreign Application Priority Data
Nov. 13, 2003 (JP) .............................. 2003/384186

(51) Int. Cl.
*H01L 27/14* (2006.01)
(52) U.S. Cl. ....................... 219/121.65; 219/121.77; 359/618; 438/487
(58) Field of Classification Search ............ 219/121.65, 219/121.66, 121.77, 121.8; 359/618
See application file for complete search history.

(56) References Cited

U.S. PATENT DOCUMENTS

| | | | |
|---|---|---|---|
| 4,218,606 A * | 8/1980 | Whitman, III ............ 219/121.6 |
| 4,409,860 A * | 10/1983 | Moriyama et al. ....... 74/490.09 |
| 4,689,491 A * | 8/1987 | Lindow et al. ......... 250/559.07 |
| 4,835,704 A * | 5/1989 | Eichelberger et al. ......... 430/22 |
| 4,970,366 A * | 11/1990 | Imatou et al. .......... 219/121.68 |
| 5,029,243 A * | 7/1991 | Dammann et al. ..... 219/121.77 |
| 5,191,571 A * | 3/1993 | Fukumoto et al. ........ 369/44.37 |
| 5,229,573 A * | 7/1993 | Stone et al. ............. 219/121.68 |
| 5,449,418 A * | 9/1995 | Takagi et al. ................. 148/304 |
| 5,475,415 A * | 12/1995 | Noethen ..................... 347/241 |
| 5,494,781 A * | 2/1996 | Ohtani et al. ................ 430/313 |
| 5,619,488 A * | 4/1997 | Ota et al. ............... 369/112.26 |
| 5,632,083 A * | 5/1997 | Tada et al. ..................... 29/827 |
| 5,661,744 A * | 8/1997 | Murakami et al. ............ 372/57 |
| 5,763,853 A * | 6/1998 | Shimomura et al. .... 219/121.62 |
| 5,825,801 A * | 10/1998 | Nishida et al. ................ 372/99 |
| 5,936,710 A * | 8/1999 | Itoh et al. ...................... 355/53 |
| 6,031,201 A * | 2/2000 | Amako et al. .......... 219/121.68 |
| 6,376,799 B1 | 4/2002 | Amako et al. |

(Continued)

FOREIGN PATENT DOCUMENTS

JP 401015945 A * 1/1989

(Continued)

OTHER PUBLICATIONS

Communication from chinese Patent Office regarding corresponding application, Jun. 30, 2006.

(Continued)

*Primary Examiner*—Samuel M Heinrich
(74) *Attorney, Agent, or Firm*—Harness, Dickey & Pierce, P.L.C.

(57) ABSTRACT

A laser processing apparatus is provided including: a laser generator generating a light beam; a branching means for branching out the light beam to a plurality of beams arranged at equal intervals; a shifting means for shifting the plurality of beams at a pitch equal to a multiple of natural number of the arranged intervals relatively over a target; and a control means for controlling the intensity of the beam synchronously with the shifting pitch of the plurality of beams.

2 Claims, 7 Drawing Sheets

U.S. PATENT DOCUMENTS

| | | |
|---|---|---|
| 6,635,849 B1 | 10/2003 | Okawa et al. |
| 6,776,276 B2 * | 8/2004 | Okamura et al. ......... 192/107 M |
| 6,797,550 B2 * | 9/2004 | Kokubo et al. .............. 438/164 |
| 6,850,812 B2 * | 2/2005 | Dinauer et al. .............. 700/166 |
| 6,862,490 B1 * | 3/2005 | Duignan .................... 700/121 |
| 6,866,969 B2 * | 3/2005 | Miyamae et al. ................ 430/5 |
| 6,888,626 B2 * | 5/2005 | Levecq et al. ............... 356/124 |
| 6,897,963 B1 * | 5/2005 | Taniguchi et al. ........... 356/500 |
| 6,992,026 B2 * | 1/2006 | Fukuyo et al. .............. 438/797 |
| 7,002,716 B2 * | 2/2006 | Wine et al. .................. 359/199 |
| 7,023,620 B1 * | 4/2006 | Sandberg et al. ............ 359/618 |
| 7,105,048 B2 * | 9/2006 | Yamazaki et al. .............. 117/3 |
| 7,115,457 B2 * | 10/2006 | Sasaki et al. ................ 438/166 |
| 2002/0126268 A1 * | 9/2002 | Matsumoto et al. ........... 355/67 |
| 2003/0153999 A1 * | 8/2003 | Miyanaga et al. ............ 700/166 |
| 2003/0181043 A1 * | 9/2003 | Tanada et al. ............... 438/689 |
| 2003/0216012 A1 * | 11/2003 | Sasaki et al. ................ 438/487 |
| 2005/0115938 A1 * | 6/2005 | Sawaki et al. .......... 219/121.73 |
| 2006/0145399 A1 * | 7/2006 | Weisser et al. .............. 264/405 |

FOREIGN PATENT DOCUMENTS

| | | |
|---|---|---|
| JP | 402137682 A * | 5/1990 |
| JP | 403281081 A * | 12/1991 |
| JP | 06-170563 | 6/1994 |
| JP | 07-136783 | 5/1995 |
| JP | 08-033993 | 2/1996 |
| JP | 410328873 A * | 12/1998 |
| JP | 2002-263876 | 9/2002 |
| WO | WO00/53365 | 9/2000 |

OTHER PUBLICATIONS

Communication from Japanese Patent Office regarding counterpart application, Jan. 10, 2006.

* cited by examiner

LASER PROCESSING APPARATUS AND LASER PROCESSING METHOD

RELATED APPLICATIONS

This application claims priority to Japanese Patent Application No. 2003-384186 filed Nov. 13, 2003 which is hereby expressly incorporated by reference herein in its entirety.

BACKGROUND

1. Field of the Invention

The present invention relates to laser processing technology, and particularly to laser processing technology which excels in mass production.

2. Related Art

As processing techniques of removing a film formed on a substrate or perforating a substrate, there is employed a method of applying a plurality of beams on one point with a target in a stationary condition. However, in such a method, since processing is performed to each point, in a case where there are a great number of points to be processed, shifting and stopping (acceleration and reduction of speed) of the target is repeated per point to be processed, an enormous period of time is required for processing.

On the other hand, there is a method whereby a light beam emitted from a laser generator is branched out to a plurality of light beams to shorten the processing time. Yet, there is a limit to the number of points branched toward due to an output limit of the laser generator. Hence, in the case of a substantial number of points to be processed, no appreciable effect is obtained. There is also a case of scattering due to branching.

To solve such output problem, Japanese Unexamined Patent Publication No. 2002-263876 employs two units of the laser generator in an overlapping manner for increasing laser intensity. Nevertheless, when using a plurality of laser generators in this manner, it is difficult to carry out adjustments to correct slippage of optical axes of the laser generators.

Further, it is conceivable to use a plurality of units of laser generators, without branching the light beam, such that one beam may be generated per laser generator. In this case, it is difficult to carry out adjustments and maintenance of pitch accuracy among the beams.

Still further, use of a plurality of laser generators increases equipment cost, thus leading to a rise in the processing cost of a product.

On the other hand, in the case of using the photolithographic process through mask projection, the time for processing is long and cost is high, hence, it is not suitable for processing large-sized substrates.

Accordingly, it is an object of the present invention to provide laser-processing technology which excels in mass production.

SUMMARY

A first embodiment of the present invention is a laser processing apparatus that comprises: a laser generator generating a light beam; a branching means for branching the light beam into a plurality of beams arranged at equal intervals; a shifting means for relatively shifting the plurality of beams on a target at a pitch equal to a multiple of a natural number of the arranged intervals; and a control means for controlling the intensity of the beam synchronously with a shifting pitch of the plurality of beams.

According to such configuration, since irradiation is carried out in an overlapping manner while shifting the plurality of beams, it is possible to efficiently form a group of many spot traces (holes) of a desired depth, without being restricted by an output limit of the laser generator, by adjusting the number of shots of a beam as appropriate at the same spot.

Further, when performing pinhole processing on a thin film formed on the substrate, there is a case of achieving the object through one-time irradiation. However, if a minute foreign object should be present at the processing position, it may sometimes be difficult to perforate with certainty by one-time irradiation only. Even in such a case, the use of the method according to the present invention enables the foreign object to be removed by means of the first irradiation by laser. Since the second irradiation makes it possible to perforate with certainty, it is possible to avoid inferior processing.

Control in the above-mentioned control means includes a control of an on/off operation of a beam.

A second embodiment of the present invention is a laser processing method, which comprises: a first irradiating step of forming a first group of spot traces by applying a plurality of beams, which are generated by branching out the light beam generated from the laser generator and arranged at equal intervals, simultaneously to the target; and a second irradiating step of forming a second group of spot traces by relatively shifting the plurality of beams at a pitch equal to a multiple of a natural number of the arranged intervals on the target such that the first group of spot traces overlaps part of the spots.

Accordingly, it is possible to efficiently form a group of many spot traces (holes) of a desired depth, without being restricted by the output limit of the laser generator, by adjusting the number of shots of a beam as appropriate at the same spot.

It is preferable to repeat the above-mentioned second irradiating step a plurality of times by considering the above-mentioned second group of spot traces as the above-mentioned first group of spot traces. In this way, it is possible to form a consecutive multiplicity of groups of spot traces.

It is preferable for a number of shots S applied to one point to be a number obtained by the following equation (1):

$$S = M \cdot (P/L) \tag{1}$$

where P is a pitch between the plurality of beams, M is a number of branches of the beam, and L is an amount of shifts (in the above formula, S is a natural number, and L is a multiple of a natural number of P). In this way, it is made possible to easily select conditions for obtaining the desired number of shots.

The relative shift of the above-mentioned plurality of beams may be performed intermittently. It is possible to enhance the positional accuracy at the time of applying a beam by stopping when applying a beam and shifting after irradiation.

Relative shifting between the plurality of beams and the target may be at consecutively variable speed, or motion at fixed speed. By making consecutive shifts without stopping the shift, high speed processing can be made. Further, by shifting at a variable speed, it becomes possible to enhance irradiation accuracy at the time of applying a beam, and further, when a complete stop is made, there is a possibility of positional slippage due to inertia. However, with the consecutive shifts, there is no such positional slippage. Still further, in the conventional method of using a plurality of laser generators, it is difficult to adjust and maintain a pitch accuracy among the beams in this case, so that irradiation while making consecutive shifts was difficult. However, according to the present invention, since one laser generator is used, it is possible to irradiate while making consecutive shifts.

It is preferable to arrange the above-mentioned plurality of beams in a matrix manner. Since a great number of spot traces may be formed all at once according to this method, further efficiency and high speed processing of numerous holes may be made.

It is preferable for the above-mentioned plurality of beams to scan back and forth on a scanning line that has once been scanned. According to this, processing with certainty becomes possible, thus making it possible to supply processed products of stable quality.

BRIEF DESCRIPTION OF THE DRAWINGS

FIGS. 3A-C are diagrams showing a relationship between the amount of shifts L when the light beam is branched out to four beams and the number of shots S.

DETAILED DESCRIPTION

An embodiment of the present invention will be described as follows with reference to the drawings. In an embodiment of the present invention, a light beam generated from one laser generator is branched out to a plurality of beams arranged at equal intervals.

A group of spot traces is formed on a target with these branched beams, and irradiation is performed by shifting the plurality of beams to be applied subsequently such that the preceding group of spot traces overlaps part of the spots. This enables a multiplicity of spot traces to be efficiently mass produced without being restricted by the output of the laser generator.

Figure 1:
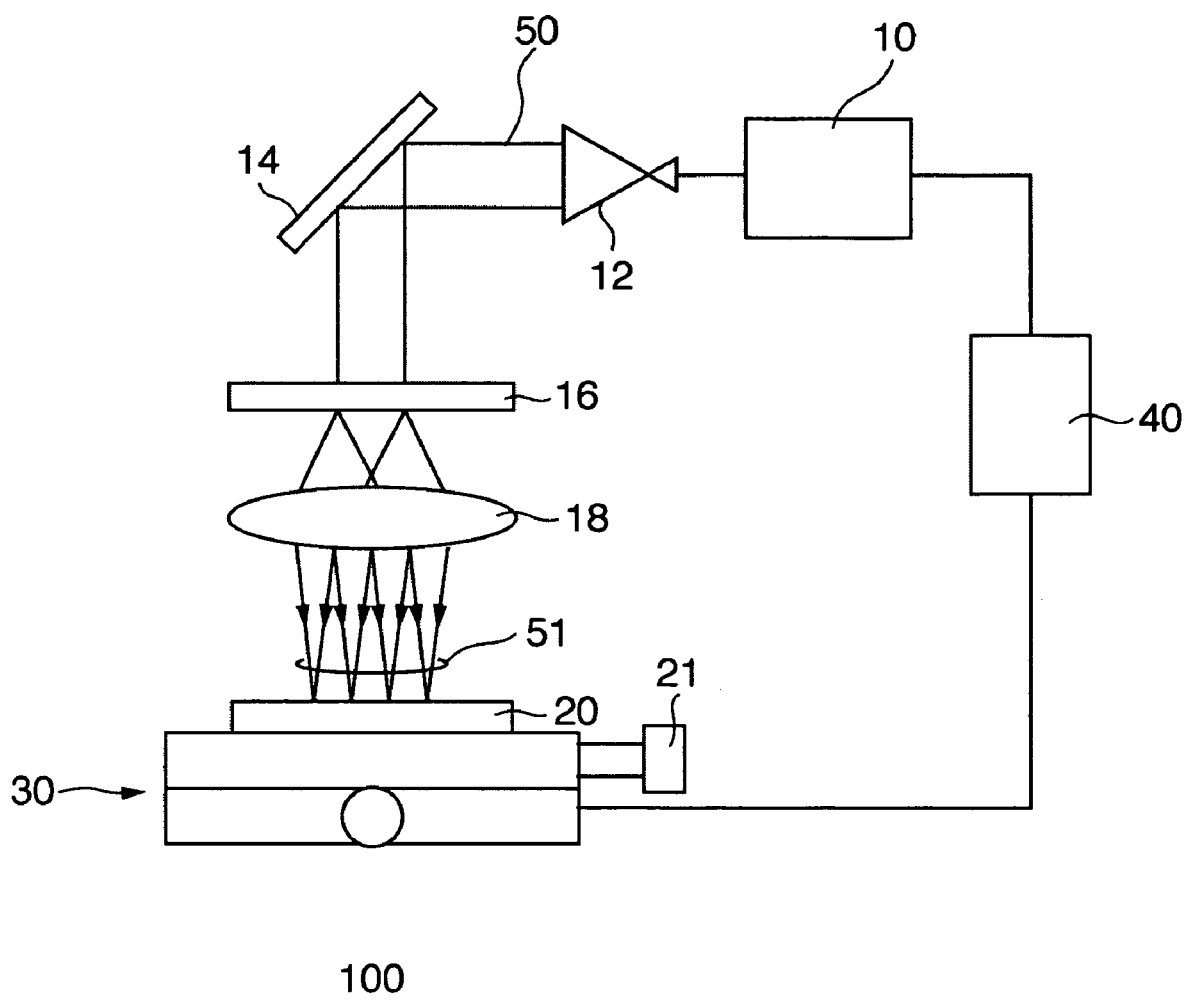
FIG. 1 is a diagram explaining a laser processing apparatus according to an embodiment of the present invention.

FIG. 1 is a diagram to explain a laser processing apparatus according to the embodiment of the present invention.

As shown in FIG. 1, the laser processing apparatus 100 of the present embodiment is configured including a laser generator 10, a diffraction grating 16, a lens 18, precision positioning tables 30, and a control 40 controlling the intensity of a beam. It should be noted that the "branching means" used herein corresponds to the diffraction grating 16 and the lens 18, while the "shifting means" used herein corresponds to the precision positioning tables 30.

Description will be made below by taking, for example, a case of perforating a metallic plate 20 as a work piece (target).

The laser generator 10 generates a light beam in response to a signal sent from the control 40. The timing of generating the light beam is determined by a relationship with a shifting distance of the metallic plate 20 which is a target. This timing will be described in detail later. As the laser generator 10 to be used herein, that which is capable of perforating the metallic plate 20, such as a $CO_2$ laser and a YAG laser, may be cited.

The diffraction grating 16 is what branches out the light beam oscillated from the laser generator 10 to a desired number of beams at equal intervals. A Fourier transform type 2-value phase grating may be cited as such diffraction grating 16. Beams 51 branched out by the diffraction grating 16 are condensed by the lens 18 onto the metallic plate 20, forming spot traces aligned at equal intervals on the metallic plate 20.

The precision positioning tables 30 are for loading and shifting the metallic plate 20. Specifically, one-axis tables are configured such that one table intersects the other mutually at 90 degrees to be layered over in two stages so as to enable a shift to be made in the xy direction. Each table is driven by a feed screw mechanism through a servo motor 21.

The control 40 transmits a drive signal to the precision positioning tables 30 to perform a pre-defined drive. The drive mode of the precision positioning tables 30 is not particularly specified and may be controlled so as to shift intermittently or to shift at a variable speed or a fixed speed. Specifically, the table shift may be suspended temporarily at the time of irradiation by the laser so as to restart the shift after the irradiation by laser (intermittent shift). Further, the table shift speed may be reduced at the time of irradiation by laser and increased after the irradiation by laser (variable speed shift). Still further, control may be made so as to shift at a fixed speed at all times (fixed speed shift).

Furthermore, the control 40 transmits a signal to the laser generator 10 to control an oscillation interval of the light beam. The interval of the light beam oscillation (interval of oscillation of the light beam) of the laser generator 10 is determined such that the next irradiation is performed when the metallic plate 20 has shifted a pre-determined distance after the preceding irradiation. This shifting distance (amount of shifts) L is determined to be a multiple of natural number (N) of a distance (branch pitch) P between the branched beams 51, that is, to meet a relationship of $L=N \cdot P$.

For example, after the first irradiation, the distance of the shift of the metallic plate is read by a linear scale counter or the like, and a signal is transmitted to the laser generator 10 so that a second irradiation is made upon shifting over a pre-defined distance. Specifically, when an electric signal of 1 pulse is read by a counter provided at each table in case of the table shifting 1 μm, as the counter reads 10 pulses (corresponding to a shift distance of 100 μm), 1 pulse of a signal is transmitted to the laser generator 10. In this case, a laser pulse is emitted per 100 μm and processed.

Next, the operation of the laser processing apparatus 100 will be described.

A light beam 5 oscillated from the laser generator 10 is enlarged by an expander collimator 12, reflected by a reflector 14, and branched out by the diffraction grating 16 to a plurality (for example, four) of beams 51. Thereafter, through a condensing lens 18, there are formed, for example, four first spot traces aligned at equal intervals along a straight line on the metallic plate 20 loaded on the precision positioning tables 30.

Then, the metallic plate 20 is shifted in a direction (x-axis direction) of forming the spot traces, that is, along the straight line on which the group of spot traces is aligned, and subjected to irradiation by the beams 51 to form a second group of spot traces. The metallic plate 20 shifts so that part of the second group of spot traces overlaps the first spot traces. Consequently, the depth of a hole finally formed is determined by the number of shots S of the beams 51 applied to one spot (one point).

Next, while referring to the drawings, relationships among the number of shots S, the amount of shifts L from a preceding irradiation position to a succeeding irradiation position, the branch pitch P of the beams 51, and the number of branches M will be described.

In FIG. 2, there is shown a relationship between the amount of shifts L when the light beam is branched out to two and the number of shots S. It should be noted that the value of L/P is listed for the amount of shifts for the sake of convenience in this drawing.

Figure 2A:
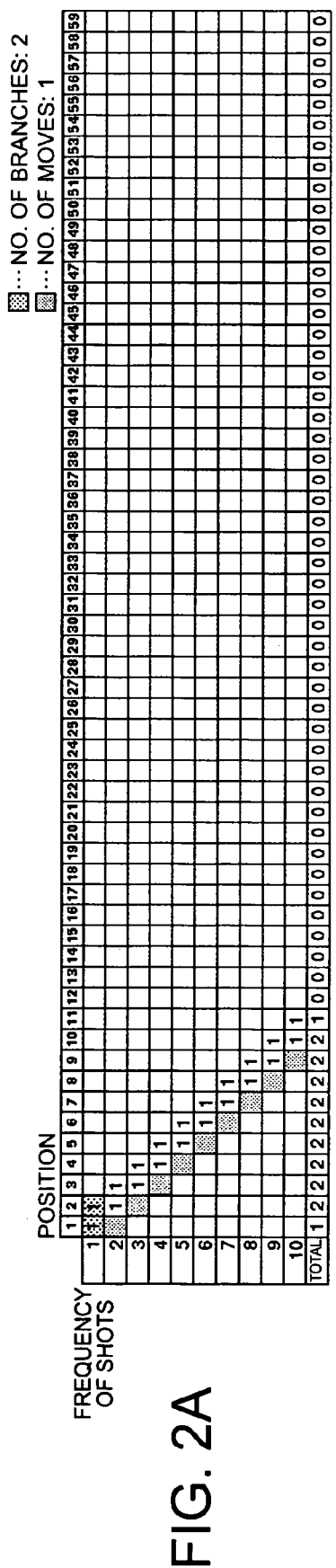
FIGS. 2A-C are diagrams showing a relationship between an amount of shifts L when a light beam is branched out to two beams and a number of shots S.

In FIG. 2A, there is shown a method of calculating the number of shots S of the beams 51 applied to one spot in case of M=2 and L/P=1. As shown in this figure, the laser irradiation position (forming position of spot traces (holes)) is taken on the transverse axis, while the frequency of shots is taken on the longitudinal axis. The amount of shifts L and the number of branches M are listed in the table. By calculating the total amount of the frequency of shots, the frequency of shots S per one spot may be obtained.

In this example, since the number of branches M is two, at the beginning, a first irradiation is made to positions 1 and 2. Next, after the irradiation position is slipped by L/P=1, a second irradiation is made. When this is repeated, at the n-th irradiation, the irradiation position slips by L/P=n−1, hence, n and n+1 are to be irradiated. Further, the frequency of shots S at each position obtained from the table becomes two.

It should be noted that when forming while making the depth of consecutive holes fixed, arranged at equal intervals, the frequency of shots S may be obtained from a formula (1) shown below.

The number of shots S, the amount of shifts L, the branch pitch P between branched beams, and the number of branches M meet a relationship shown in the following formula (1):

$$S = M - (P/L) \quad (1).$$

where S is a natural number and L is a multiple of a natural number (N) of P.

Figure 2B:
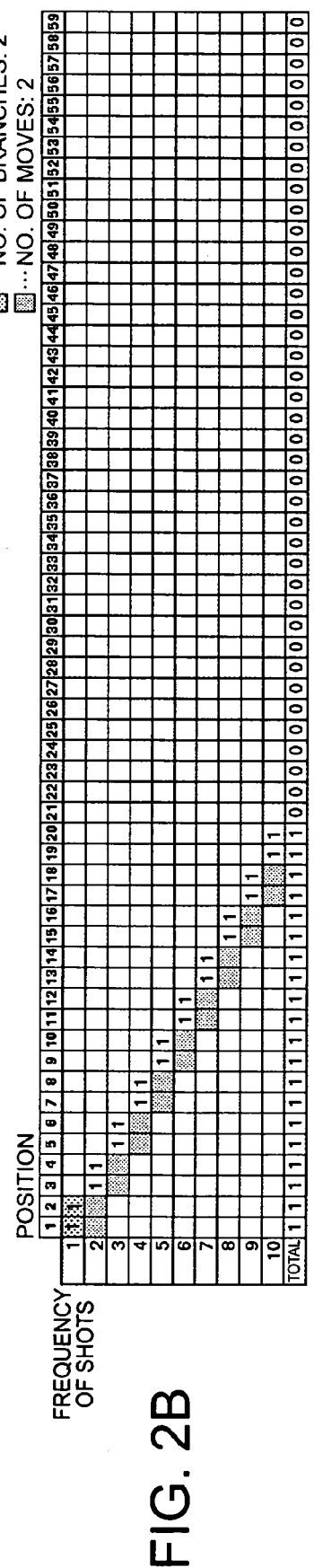

FIG. 2B shows a method of calculating the number of shots S of the beams 51 applied to one spot in the case of M=2 and L/P=2. In this case, the frequency of shots S at each position obtained from the table becomes one.

Figure 2C:
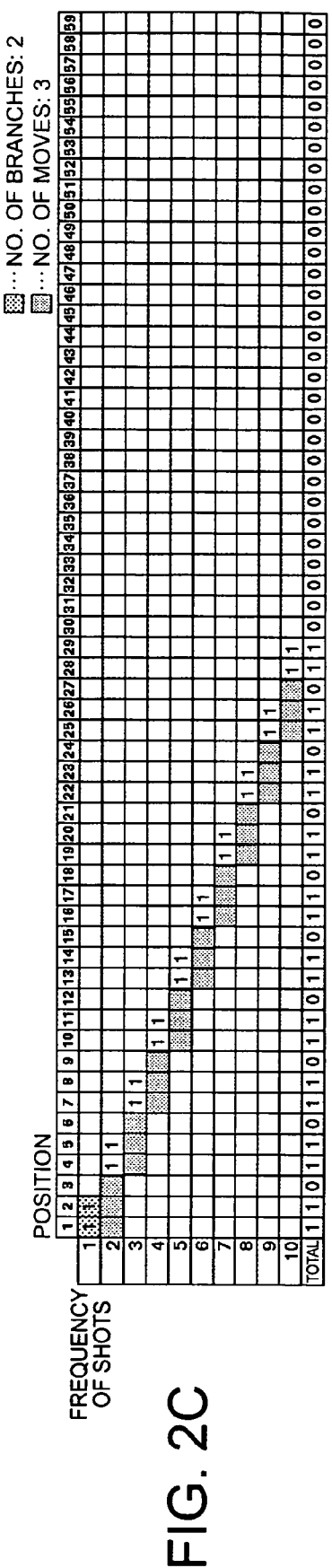

FIG. 2C shows a method of calculating the number of shots S of the beams 51 applied to one spot in the case of M=2 and L/P=3. In this manner, if a relationship between the amount of shifts L and the number of branches M is L>M, as shown in the table in this figure, it is impossible to carry out overlapping irradiation on one spot.

FIGS. 3A to C and FIGS. 4D to E respectively show a relationship with the number of shots S of the beams 51 applied to one spot in the case of M=4 and L/P=1 to L/P=5. It should be noted that the value of L/P is listed for the amount of shifts for the sake of convenience in these drawings.

Figures 3A, 3B, 3C:
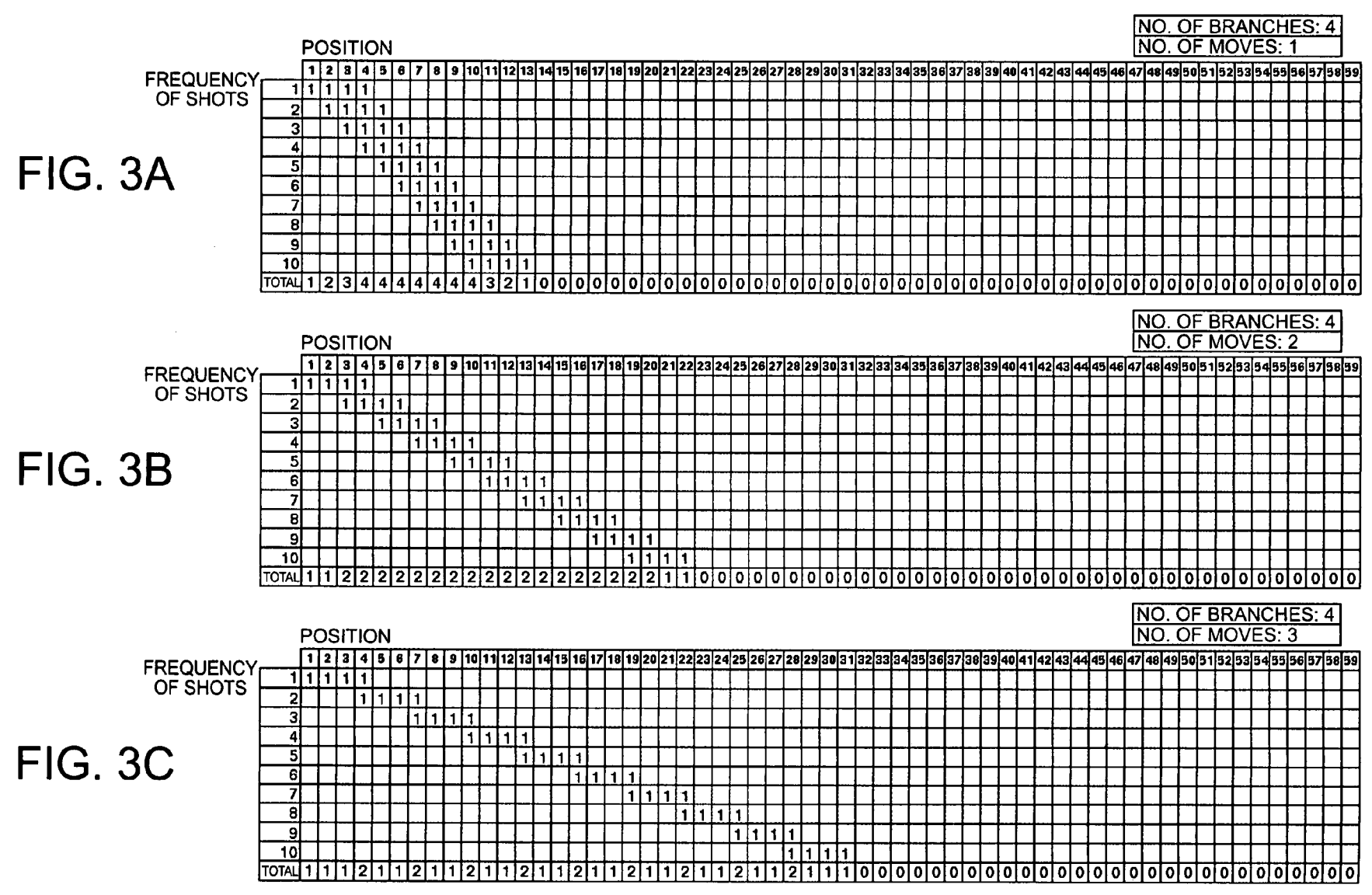

As shown in FIG. 3A, if the number of branches M is increased, the number of shots S of the beams 51 to be applied to one spot increases. Namely, S=4, in the case of M=4 and L/P=1.

Figure 4D:
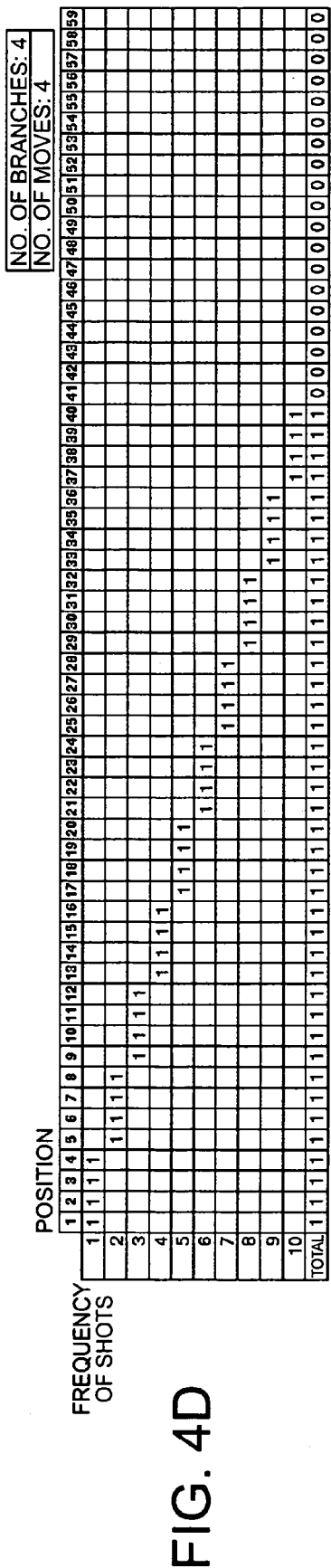
FIGS. 4D-E are diagrams showing a relationship between the amount of shifts L when the light beam is branched out to four beams and the number of shots S.

As shown in FIG. 3B and FIG. 4D, in the case of M=4 and L/P=2 or L/P=4, the number of shots S of the beams 51 to be applied to one spot respectively becomes S=2 and S=1, so that it is possible to form holes of equal intervals respectively at the fixed depth.

Further, as shown in FIG. 3C, in the case of M=4 and L/P=3, S changes periodically. Therefore, this condition may be used in the case of forming deeply only pre-defined holes at fixed intervals.

Figure 4E:
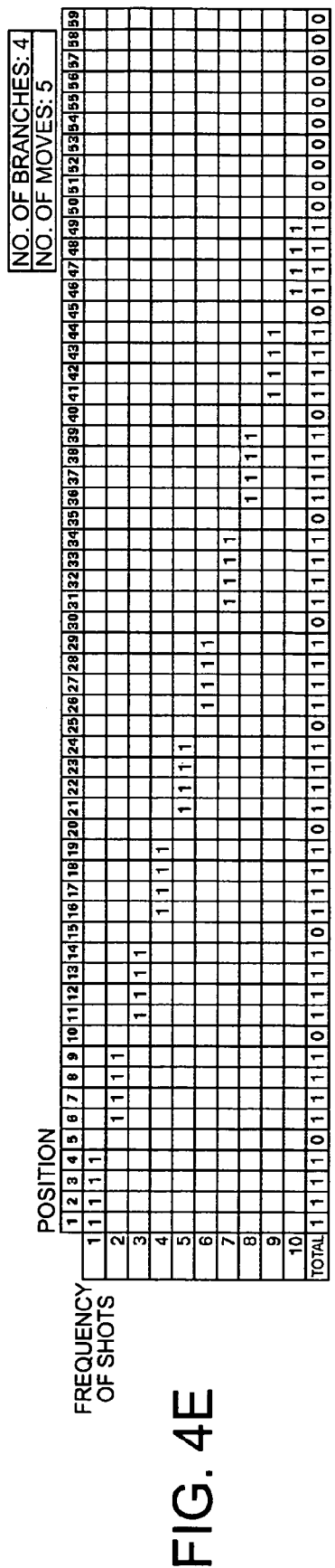

As shown in FIG. 4E, in the case of M=4 and L/P=5, because L/P>M, it is impossible to carry out overlapping irradiation on the same spot.

Next, a process of forming a hole through overlapping irradiation will be specifically described by taking, for instance, the case of M=4 and L/P=2.

FIG. 5 is a diagram to specifically explain the irradiation process when the light beam is branched out to four beams.

Figure 5A:
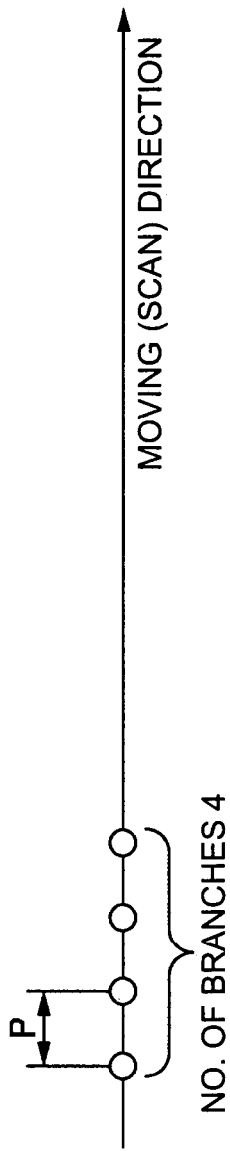
FIGS. 5A-C are diagrams explaining specifically an irradiation process when the light beam is branched out to four beams.

FIG. 5A shows a group of spot traces formed when the light beam 50 is branched out to four (M=4). As shown therein, the distance P between spot traces is an equal interval.

Figure 5B:
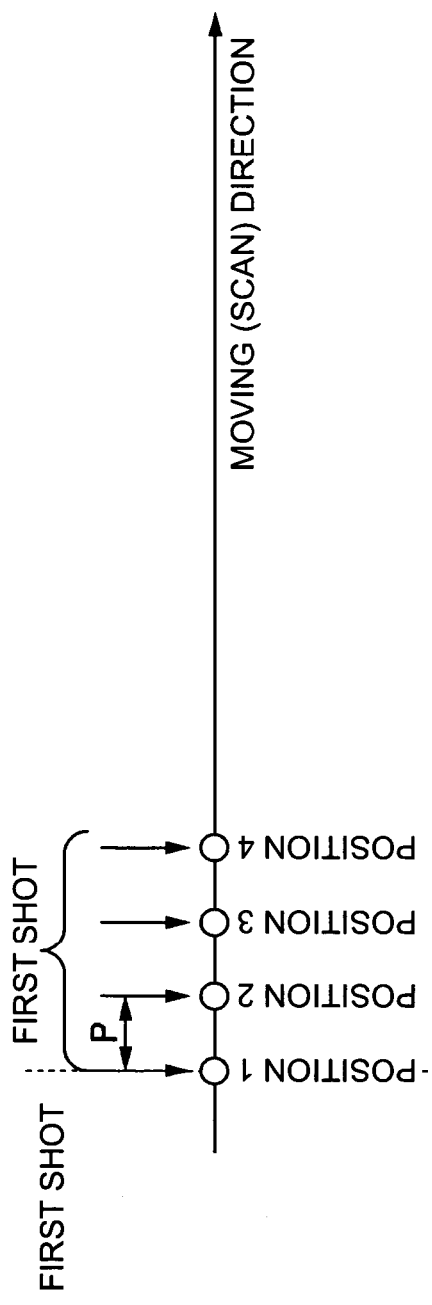

As shown in FIG. 5B, by way of the first shot (first irradiation, hereinafter, referred to the same), the group of spot traces is formed at a distance of P between pitches at positions 1 to 4. At this point, white circles placed on the shifting (scan) directional axis in the drawing show holes formed when one shot of irradiation by the laser is made.

Figure 5C:
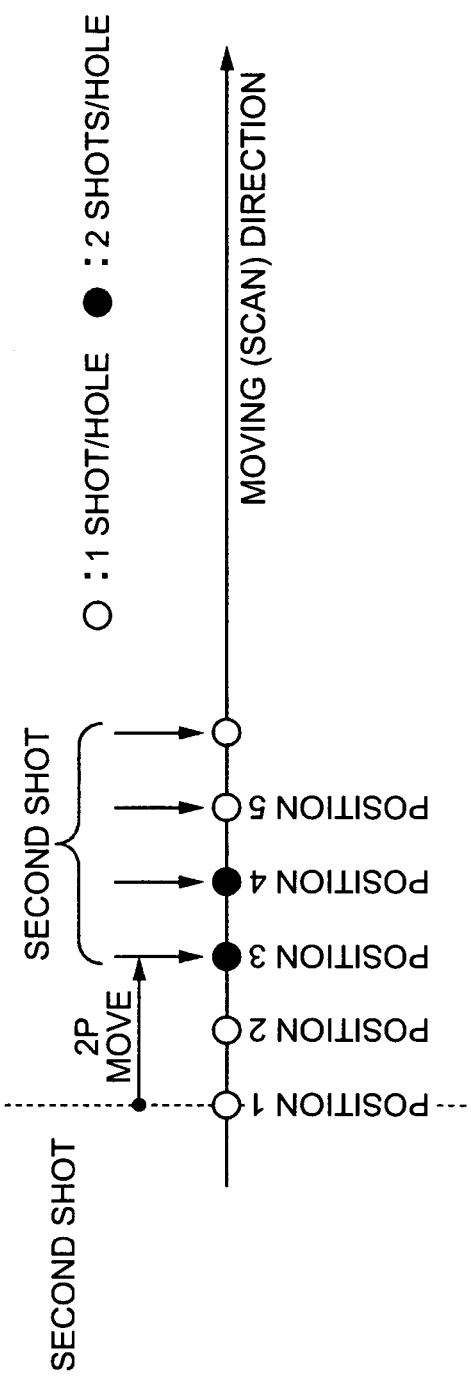

As shown in FIG. 5C, a second shot of irradiation is made from position 3 to position 6 by shifting 2P. This enables irradiation by the laser to be made in two shots. At this point, black circles placed on the shifting directional axis in the drawing show holes formed when two shots of irradiation by the laser are made.

Figure 6D:
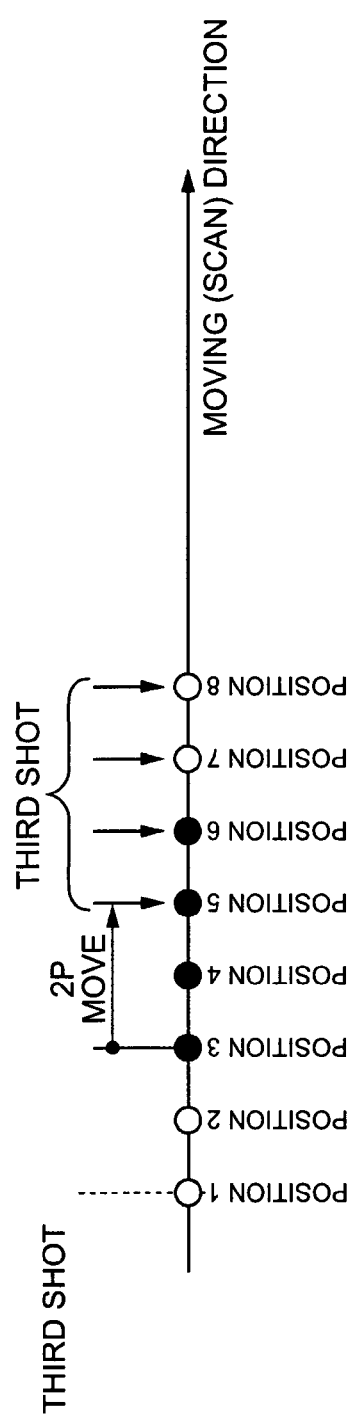
FIGS. 6D-F are diagrams explaining specifically the irradiation process when the light beam is branched out to four beams.

As shown in FIG. 6D, a third shot of irradiation is made from position 5 to position 8 by shifting 2P from the reference position 3 of the second shot.

Figure 6E:
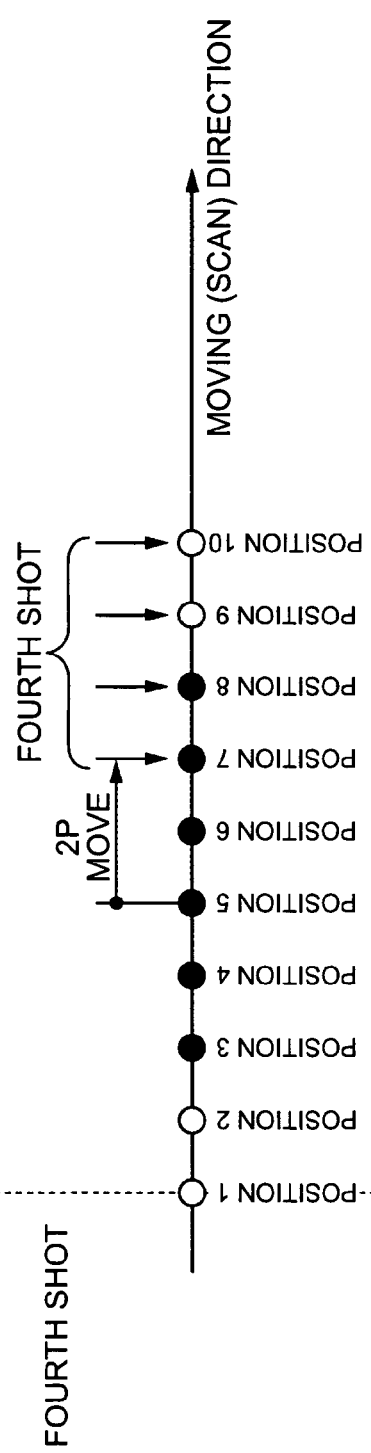

As shown in FIG. 6E, a fourth shot of irradiation is made from position 7 to position 10 by shifting 2P from the reference position 5 of the third shot.

Figure 6F:

FIG. 6F shows a group of spot traces formed when an n-th shot of irradiation is made. The n-th shot is made on position 2n−1 by shifting 2P from the reference position 2n−3 of the (n−1)-th shot.

In this manner, by carrying out irradiation in terms of shifting per 2P, it is possible to efficiently form mutually adjacent holes at equal intervals whose depth are all fixed (two shots of irradiation by the laser).

In the present embodiment, by using branched beams of a plurality of beams produced as the light beam generated by the laser generator was branched out, the branched beams are applied in an overlapping manner while shifting at a predefined pitch. Consequently, without being restricted by the output limit, the number of shots at the same spot of the beams is adjusted as appropriate, so that many groups of spot traces (holes) of a desired depth may be efficiently formed.

It should be noted that conditions such as the number of shots S, the number of branches M, and the amount of shifts L are not bound by the above-mentioned examples, and may be selected properly within a range of solving the problem of the present invention.

In the present embodiment, a case where beams branch out in a single line was described, but beams branched out in a matrix pattern may be used.

Figure 7:
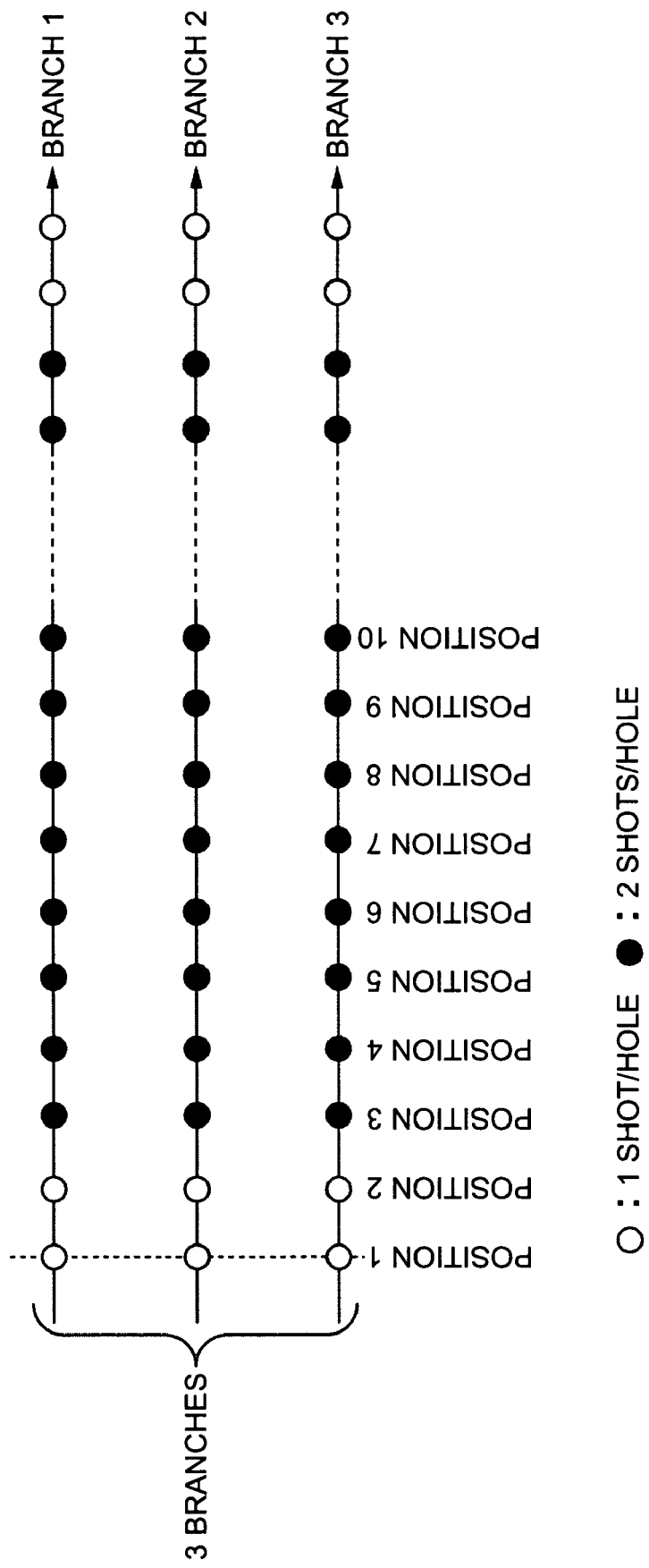
FIG. 7 shows an example when the beams are branched out in a matrix pattern.

FIG. 7 illustrates a case where beams branched out in a matrix pattern is used. A case is illustrated where the light beam 50 which is branched out to four branches in the forward direction and further branched out to three branches in the forward direction and the perpendicular direction (a case of branching 4×3 branches).

In this case, too, by shifting at the same pitch interval (for example, per 2P), it is possible to carry out irradiation for a plurality of times on the same spot.

In this manner, by using beams branched out in a matrix pattern, it is possible to form a huge amount of spot traces in one operation, thus enabling further efficiency and high speed operation of multi-hole processing to be achieved.

Further, irradiation of the same spot may be carried out again by scanning back and forth on a scanning line that has once been scanned. Through this operation, it becomes possible to form spot traces with certainty, thus enabling processed products of stable quality to be provided.

In the present embodiment, shifting of an irradiation beam relative to the metallic plate which is subject to irradiation is performed by the precision positioning tables which load the metallic plate. However, not bound by this, the shifting may be done, for example, by moving an optical system from the laser generator 10 to the condensing lens 18. Also, it may be done by moving only an optical system from the reflector 14 to the condensing lens 18.

While the laser processing method of the present embodiment has been described by taking perforation processing for example, it is not limited to such processing and processing such pin-hole processing of a thin film may be used. When performing pin-hole processing to a thin film form on the substrate, one-time irradiation may accomplish the objective. However, for example, in a case where there are minute foreign objects at the processing position, it may be difficult for one-time irradiation to accomplish the objective. Even in such a case, according to the method of the present embodiment, it is possible to remove any foreign object by the first laser irradiation and to perforate with certainty by the second irradiation, thereby making it possible to avoid inferior processing.

Further, the laser processing method of the present embodiment may be applied to thin film exposure.

The present invention may be suitably used, for example, for devices that require the processing of many holes such as manufacturing a micro lens array used for rear projection as well as perforating a fluid course of a high density inkjet head.

What is claimed is:

1. A laser processing apparatus, comprising:
   a laser generator generating a light beam;
   a branching means for branching out the light beam to a plurality of beams arranged at equal intervals and for forming a first group of spot traces having a plurality of spot traces in an x direction along a straight line and a plurality of spot traces in a y direction perpendicular to the straight line to form a first matrix pattern, said spot traces of said first group being separated by an equal branch pitch interval between said spot traces in said x direction;
   a shifting means for relatively shifting the plurality of beams in said x direction along the straight line on a target at a pitch equal to a multiple of the equal branch pitch interval to form a second group of spot traces, the target being a thin film form on a substrate, said spot traces of said second group being separated by said equal branch pitch interval between said spot traces in said x direction and having a plurality of spot traces in the x direction along the straight line and a plurality of spot traces in the y direction perpendicular to the straight line to form a second matrix pattern, and with a plurality of spot traces in said second group of spot traces overlapping with a plurality of spot traces in said first group of spot traces, wherein the shifting means includes a first positioning means and a second positioning means for shifting the plurality of beams in an x-y direction, the first positioning means including a first positioning table and the second positioning means including a second positioning table, the first and second positioning tables being configured to intersect at 90 degrees and being layered to enable shifting in the x-y direction; and
   a control means for controlling an intensity of the beam synchronously with the shifting pitch of the plurality of beams and for controlling the relative shift between the plurality of beams and the target at variable speeds, the control means transmitting a drive signal to the first and second positioning tables to perform an intermittent shift, wherein a positioning table shift is suspended temporarily during irradiation by the light beam and restarted after irradiation by the light beam, a variable speed shift, wherein a speed of the positioning table shift is reduced during irradiation by the light beam and increased after irradiation by the light beam, and a fixed speed shift, wherein the speed of the positioning table shift is fixed, and the control means transmitting the drive signal to the first and second positioning tables to relatively shift the plurality of beams in said x direction along the straight line on the target at the pitch equal to the multiple of the equal branch pitch interval to form the second group of spot traces and controlling the laser generator to perform a first laser irradiation operation by scanning the plurality of beams on a scanning line of the target to remove foreign objects from the target and a second laser irradiation operation by scanning the plurality of beams on the scanning line of the target to perforate the target;
   wherein the control means transmits a signal to the laser generator to control an oscillation interval of the light beam in accordance with the positioning table shift.

2. A laser processing apparatus, comprising:
   a laser generator generating a light beam;
   a brancher branching out the light beam to a plurality of beams arranged at equal intervals and forming a first group of spot traces having a plurality of spot traces in an x direction along a straight line and a plurality of spot traces in a y direction perpendicular to the straight line to form a first matrix pattern, said spot traces of said first group being separated by an equal branch pitch interval between said spot traces in said x direction;
   a shifter relatively shifting the plurality of beams on a target at a pitch equal to a multiple of a natural number of the equal branch pitch interval to form a second group of spot traces, the target being a thin film form on a substrate, said spot traces of said second group being separated by said equal branch pitch interval between said spot traces in said x direction and having a plurality of spot traces in the x direction along the straight line and a plurality of spot traces in the y direction perpendicular to the straight line to form a second matrix pattern, and with a plurality of spot traces in said second group of spot traces overlapping with a plurality of spot traces in said first group of spot traces, wherein the shifter includes a first positioning table and a second positioning table that shift the plurality of beams in an x-y direction, the first and second positioning tables being configured to intersect at 90 degrees and being layered to enable shifting in the x-y direction; and
   a controller controlling an intensity of the beam synchronously with the shifting pitch of the plurality of beams and for controlling the relative shift between the plurality of beams and the target at variable speeds, the controller transmitting a drive signal to the first and second positioning tables to perform an intermittent shift, wherein a positioning table shift is suspended temporarily during irradiation by the light beam and restarted after irradiation by the light beam, a variable speed shift, where a speed of the positioning table shift is reduced during irradiation by the light beam and increased after irradiation by the light beam, and a fixed speed shift, wherein the speed of the positioning table shift is fixed, and the controller transmitting the drive signal to the first and second positioning tables to relatively shift the plurality of beams in said x direction along the straight line on the target at the pitch equal to the multiple of the equal branch pitch interval to form the second group of spot traces and controlling the laser generator to perform a first laser irradiation operation by scanning the plurality of beams on a scanning line of the target to remove foreign objects from the target and a second laser irradiation operation by scanning the plurality of beams on the scanning line of the target to perforate the target;

wherein the controller transmits a signal to the laser generator to control an oscillation interval of the light beam in accordance with the positioning table shift.

* * * * *